United States Patent
Garcelon

(10) Patent No.: US 7,320,132 B2
(45) Date of Patent: Jan. 15, 2008

(54) SOFTWARE METHODS OF AN OPTICAL NETWORKING APPARATUS WITH MULTIPLE MULTI-PROTOCOL OPTICAL NETWORKING MODULES

(76) Inventor: Robert C. Garcelon, 12170 NW. Big Fir Ct., Portland, OR (US) 97229

( * ) Notice: Subject to any disclaimer, the term of this patent is extended or adjusted under 35 U.S.C. 154(b) by 675 days.

(21) Appl. No.: 10/211,005

(22) Filed: Aug. 2, 2002

(65) Prior Publication Data

US 2004/0022251 A1 Feb. 5, 2004

(51) Int. Cl.
  G06F 3/00 (2006.01)
  G06F 9/44 (2006.01)
  G06F 9/46 (2006.01)
  G06F 13/00 (2006.01)
  G06F 15/177 (2006.01)
  H04L 12/28 (2006.01)
  H04L 12/56 (2006.01)

(52) U.S. Cl. ............... 719/328; 370/395.5; 370/395.51; 370/907; 398/58; 709/220; 709/221; 709/222

(58) Field of Classification Search ................ 718/328; 370/395.51–401, 907, 395.5; 398/58; 709/220–222
See application file for complete search history.

(56) References Cited

U.S. PATENT DOCUMENTS

| | | | |
|---|---|---|---|
| 6,567,413 B1 * | 5/2003 | Denton et al. ............ | 370/401 |
| 7,002,967 B2 | 2/2006 | Denton et al. | |
| 7,130,948 B2 * | 10/2006 | Bian et al. ................. | 710/260 |
| 2002/0091863 A1 * | 7/2002 | Schug ........................ | 709/250 |
| 2003/0145129 A1 * | 7/2003 | Nagalkar .................... | 709/321 |
| 2003/0188026 A1 * | 10/2003 | Denton et al. ............. | 709/249 |
| 2004/0024857 A1 * | 2/2004 | Cai ............................ | 709/223 |
| 2004/0057390 A1 * | 3/2004 | Boleyn et al. ............. | 370/254 |

* cited by examiner

Primary Examiner—William Thomson
Assistant Examiner—Qing-Yuan Wu
(74) Attorney, Agent, or Firm—Berkeley Law & Technology Group, LLP

(57) ABSTRACT

An API is provided to an optical networking apparatus to facilitate uniform access, control or interaction with its multi-protocol optical networking modules (MPONM) by its applications. Each of the MPONM has a number of function blocks having corresponding service routines. In response to an application's request to initialize a MPONM, the initialization function of the API cooperates with the function block service routines to create a data structure for the MPONM, and returns a handle of the data structure to the application. Thereafter, in response to a need to have an operation performed in a function block of a MPONM, the application makes the request with an externalized function the API associated with the function block, including with the request the handle of the data structure of the MPONM.

44 Claims, 4 Drawing Sheets

SOFTWARE METHODS OF AN OPTICAL NETWORKING APPARATUS WITH MULTIPLE MULTI-PROTOCOL OPTICAL NETWORKING MODULES

FIELD OF THE INVENTION

The present invention relates to software methods and networking apparatuses. More specifically, the present invention relates to software methods to provide uniform access, control and/or interaction with function blocks of multi-protocol network processors of multi-protocol optical networking modules (MPONM) in an optical networking apparatus.

BACKGROUND OF THE INVENTION

With advances in integrated circuit, microprocessor, networking and communication technologies, an increasing number of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relays, and the like. Of particular importance is the TCP/IP based global inter-network, the Internet. Historically, data communication protocols specified the requirements of local/regional area networks, whereas telecommunication protocols specified the requirements of the regional/wide area networks. The rapid growth of the Internet has fueled a convergence of data communication (datacom) and telecommunication (telecom) protocols and requirements. It is increasingly important that data traffic be carried efficiently across local, regional, as well as wide area networks.

As a result of this trend of increased connectivity, an increasing number of applications that are network dependent are being deployed. Examples of these network dependent applications include but are not limited to, the world wide web, email, Internet based telephony, and various types of e-commerce and enterprise applications. The success of many content/service providers as well as commerce sites depend on high speed delivery of a large volume of data across wide areas. As a result, high speed data trafficking devices, such as high speed optical, or optical-electro routers, switches and so forth, are needed.

Unfortunately, because of the multiplicity of protocols, including datacom and telecom protocols, that may be employed to traffic data in the various types of networks, designers and developers of networking components and equipment, such as line cards, routers and switchers, have to wrestle with a multitude of prior art protocol processors. Each of these protocol processors is typically dedicated to the support of either local/regional or regional/wide area protocols, in their design of these components/equipment. This burden is costly, and slows down the advancement of high speed networks.

U.S. patent application Ser. Nos. 09/860,207 (now U.S. Pat. No. 7,002,967) and 09/861,002 (now U.S. Pat. No. 6,567,413), both filed on May 18, 2001, entitled "A MULTI-PROTOCOL NETWORKING PROCESSOR WITH DATA TRAFFIC SUPPORT SPANNING LOCAL, REGIONAL AND WIDE AREA", and "AN OPTICAL NETWORKING MODULE INCLUDING PROTOCOL PROCESSING AND UNIFIED SOFTWARE CONTROL" respectively, disclosed a novel highly flexible multi-protocol network processor capable of supporting high-speed data traffic in local, regional, and wide area networks, and a multi-protocol optical networking module that can be constructed from such a multi-protocol network processor. Resultantly, sophisticated optical-electrical networking apparatuses such as optical-electrical routers and switches may be built more efficiently with multiple ones of the disclosed multi-protocol optical networking module (each having its own multi-protocol network processor).

In turn, the task for developing networking applications for such sophisticated optical-electrical networking apparatus with multiple ones of the disclosed multi-protocol optical networking module (each having its own multi-protocol network processor) have become much more difficult. Accordingly, a software architecture, including methods, that reduces the complexity and improves the ease for developing networking applications for such complex networking apparatuses with multiple ones of the disclosed multi-protocol optical networking module (each having its own integrated multi-protocol network processor) is desired.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

Figure 1:
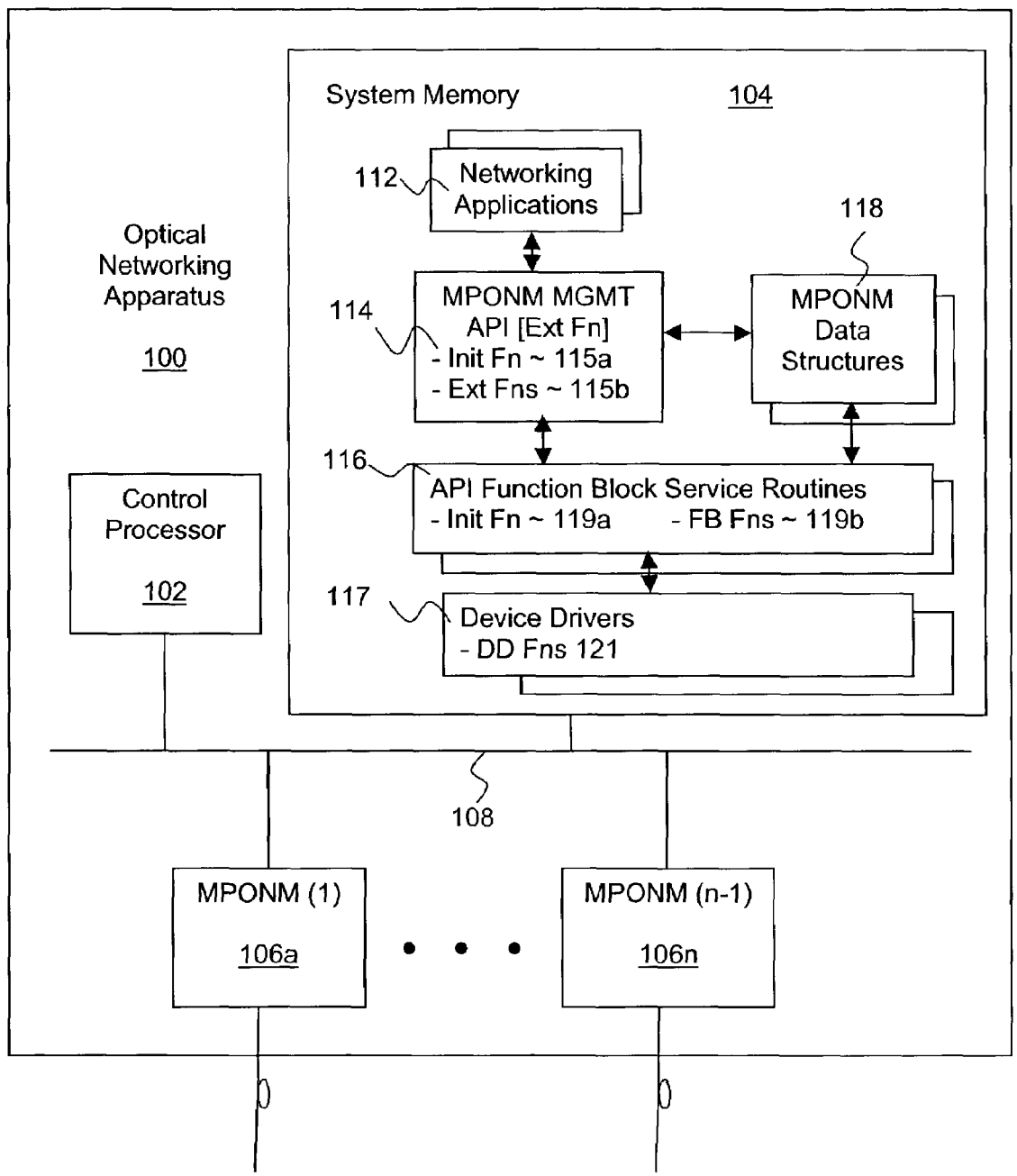
FIG. 1 illustrates an overview of the software method of present invention, including an optical-electrical networking apparatus having multiple MPONM (each integrated with a multi-protocol network processor), within which the present invention may be practiced, in accordance with one embodiment.

The present invention includes software methods, in particular, an application programming interface (API) for networking applications to interact with function blocks of multi-protocol network processors of MPONM of an optical-electrical networking apparatus.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in data processing terms, such as data, variables, methods, request, return, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will be described using networking terms, including but are not limited to:

| | |
|---|---|
| Egress | Outgoing data path from the system to the network |
| HDLC | High-Level Data Link Control. A communication protocol used in Packet Over SONET switching network. |
| Ingress | Incoming data path from the network to the system |
| IP | Internet Protocol |
| LAN | Local Area Network |
| MAC | Media Access Control layer, defined for Ethernet systems |
| POS | Packet Over SONET |
| PPP | Point to Point Protocol |
| SONET | Synchronous Optical NETwork, a PHY telecommunication protocol |
| WAN | Wide Area Network |

The terms "provide" and "providing", and other terms of the like, as used in this specification and in the claims, include indirect as well as direct provision of the object of the provision operation. That is, an entity A may "provide" another entity B with an item C (the object of the provision operation) directly, or indirectly by providing entity B with information to obtain the object item C, such as a pointer to a location from which the object item C may be obtained.

Section Headings, Order of Description and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may.

Overview

Referring now to FIG. 1, wherein a block diagram illustrating an overview of the software method of the present invention, in accordance with one embodiment, including an optical-electrical networking apparatus having multiple MPONM within which the present invention may be practiced, is shown. As illustrated, for the embodiment, optical networking apparatus 100 includes a number of MPONM 106a-106n, a control processor 102, and memory 104, coupled to each other through system bus 108. Each of MPONM 106a-106n includes at least one multi-protocol network processor having a number of function blocks, as described in the above identified co-pending U.S. pending patent applications.

In various embodiments, the various MPONM 106a-106n may be connected to system bus 108 in like or different manners. For examples, all MPONM 106a-106n may be connected via corresponding serial or parallel interfaces, or some MPONM 106\* are connected via corresponding serial interfaces, while others are connected via corresponding parallel or other bus interfaces.

Accordingly, for the embodiment, various device drivers 117 having functions 121 are provided to facilitate the various corresponding types of interfaces for connecting MPONM 106a-106n to system bus 108. That is, a serial interface oriented device driver 117 is provided to facilitate connection of some or all of MPONM 106a-106n via corresponding serial interfaces, a parallel interface oriented device driver 117 is provided to facilitate connection of some or all of MPONM 106a-106n via corresponding parallel interfaces, and so forth.

In one embodiment, the function blocks include a system interface block, a network interface block, a MAC block, an Ethernet 64/64 coder, an Ethernet on SONET coder block, a PPP protocol and HDLC processor block, a HDLC Packet over SONET coder block, a SONET path processor block, a SONET section and line processor block, and a control interface. The various function blocks are selectively employed in combination to service data transmission and receipt in accordance with a selected one of a number of frame based protocols, including frame based protocols encapsulated within a synchronous protocol, as well as streaming and packet variants of the synchronous protocol. These protocols include at least one each a datacom and a telecom protocol.

Briefly, the system interface block is employed to facilitate input of egress data from the system and output of ingress data to the system from MPONM. The MAC block is employed to perform data link sub-layer media access control processing on egress and ingress MAC data. The Ethernet 64/66 coder and Ethernet on SONET Coder blocks are provided to perform physical sub-layer 64/66 and Ethernet on SONET coding and decoding for the egress and ingress MAC data respectively.

The PPP/HDLC processor block is employed to perform data link sub-layer point-to-point protocol and high level data link control processing on IP, PPP, and HDLC data. The PPP/HDLC processor is employed to frame or de-frame IP and POS data, providing appropriate encapsulation or de-encapsulation, in accordance with PPP and HDLC. The HDLC POS coder block is provided to perform physical sub-layer Packet Over SONET coding and decoding for the egress and ingress HDLC data respectively.

The SONET path processor block is provided to perform path processing for "packetized" SONET data and coded frame-based data, whereas the SONET section and line processor block is provided to perform section and line processing for "packetized" as well as "streaming" SONET data. The network interface block is provided to facilitate output of egress data and input of ingress data.

The control interface is employed to facilitate interaction between the multi-protocol processor and external devices.

The optical-electrical components of a MPONM 106\* include e.g. digital-to-analog and analog-to-digital components, as well as laser components for encoding data on an optical beam and/or decoding data from an encoded optical beam. For the purpose of the present application, the optical-electrical components of a MPONM 106\* is also referred to as a "function block". Accordingly, the term "function block" as used in the claim refers to a selected one of the function blocks of a multi-protocol processor and the collection of the optical-electrical components of a MPONM 106\*.

Thus, if networking applications 112 are required to access, control or otherwise interact with each of these function blocks of each of the network processors of the MPONM directly, the complexity may become if not prohibitive, at least not very productive for the average software developers, especially in view of the multiplicity of network processors and MPONM present in each optical networking apparatus 100, and the different manners the MPONM 106\* may be connected.

Accordingly, under the present invention, MPONM API 114 and function block service routines 116 are provided for interfacing with the function blocks of the network processors of the MPONM, to insulate the complexity of the function blocks of the network processors of the MPONM from networking applications 112. In particular, for the embodiment, MPONM API 114 includes at least an externalized module initialization function 115a and a number of externalized functions 115b associated with corresponding function blocks, provided to further streamline the interactions between networking applications 112 and MPONM function block service routines 116. Examples of externalized functions 115b include but are not limited to externalized functions correspondingly associated with controlling the operations of the MAC, SONET, and other function blocks.

In various embodiments, a number of externalized cross function blocks functions (not shown) may also be provided as part of MPONM API 114. An example of such functions is a configuration function to set the various configurable parameters of the function blocks.

As will be described in more detail below, MPONM API 114 buffers networking applications 112 making access, controlling, or otherwise interacting with the MPONM, through MPONM function block service routines 116 using MPONM data structures 118, one for each MPONM 106\*.

The term "externalized" is used in the current context from the visibility perspective of networking applications 112 for ease of understanding. The characterization has no significance as to the essence of the present invention.

Except for MPONM API 114, including the initialization and externalized functions, the teachings of the present invention incorporated with function block service routines 116, and the manner networking applications 112 and function block service routines 116 cooperate with MPONM API 114, networking applications 112 and function block service routines 116 otherwise represent a broad range of such elements known in the art, and are typically application dependent. Accordingly, except for the manner networking applications 112 and function block service routines 116 cooperate with MPONM API 114, the two elements will not be otherwise further described.

[The asterisk at the end of a reference number denotes a "wild card", representing any of the trailing suffixes of the reference numbers employed in a figure. For example, 106\* stands for 106a, 106b or any one of the other 106 references of FIG. 1.]

Networking Applications

Figure 2A:
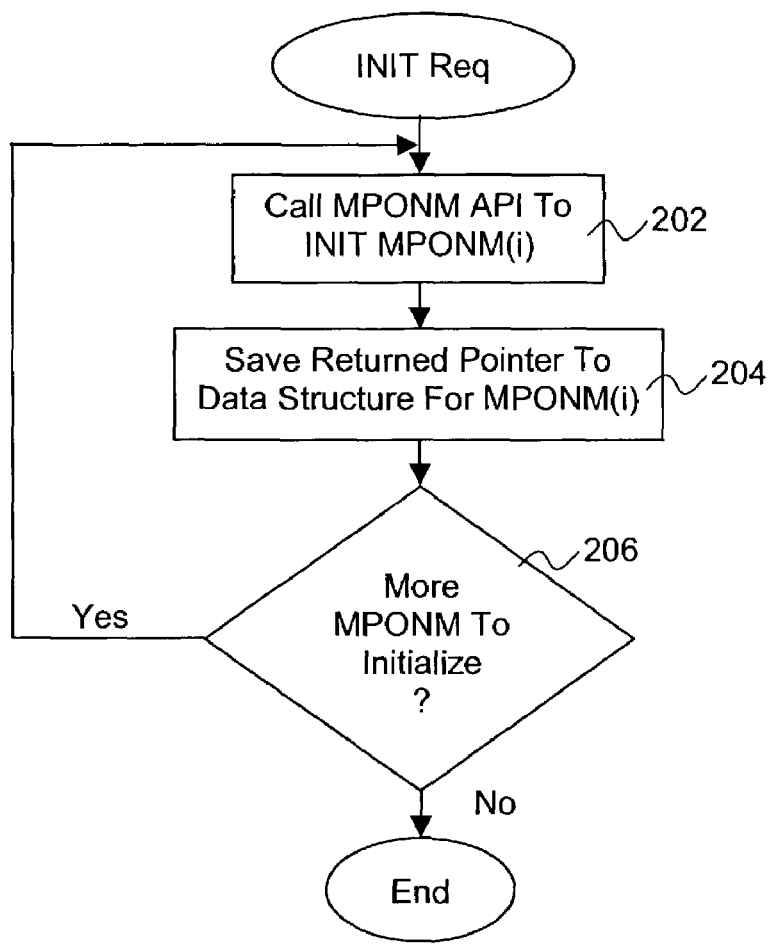
FIGS. 2a-2b illustrate the operational flow of the relevant aspects of a networking application of FIG. 1 interacting with the MPONM API of the present invention, to access, control and/or otherwise interact with the function blocks of the multi-protocol network processor of the MPONM, in accordance with one embodiment.
Figure 2B:
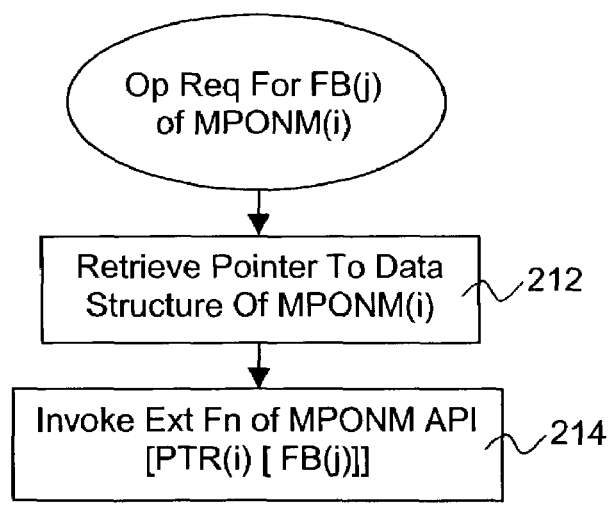

FIGS. 2a-2b illustrate the operating flow of the relevant aspects of networking applications 112 for practicing the present invention, in accordance with one embodiment. As illustrated in FIG. 2a, under the present invention, i.e. with the provision of MPONM API 114 including an externalized module initialization function 115a, at initialization or a subsequent point in time at the desire of a networking application 112, the networking application 112 invokes the module initialization function 115a of MPONM API 114 to initialize a desired MPONM 106\* it wants to subsequently access, control or otherwise interact with, block 202.

In one embodiment, networking application 112 identifies the particular MPONM 106\* by providing (one or more of) the "handles" of the device driver 117 handling the connecting interface through which the particular MPONM 106\* is connected to bus 108, and if applicable, information (such as memory mapped addresses, port numbers and so forth) associated with how the particular MPONM 106\* is mapped on the connecting interface.

As will be described in more detail below, in response, the module initialization function 115a of MPONM API 114, in conjunction with the function block service routines 116 (more specifically, init function 119a of the function block service routines 116), advantageously creates an instance of a MPONM structure 118 for the desired MPONM 106\* to be initialized (if the data structure 118 has not been previously created for the desired MPONM 106\*) to facilitate subsequent access, control and/or interaction with the desired MPOMN 106\* by networking applications 112. As part of the process, a handle of the data structure 118 for the desired MPONM 106\* is returned. More specifically, in one embodiment, the "handle" is a pointer to the corresponding module data structure 118 of the desired MPONM 106\*.

Thus, as illustrated, networking application 112 saves the returned handle (or pointer) to the corresponding module data structure 118 for the initialized MPONM 106, upon receipt of the handle (or pointer) from the module initialization function of MPONM API 114.

Thereafter, networking application 112 determines if another MPONM 106 is to be initialized, block 206. If so, operations 202-204 are repeated; else the initialization process for networking application 112 continues and proceeds to completion.

In other embodiments, module initialization function 115a may support each initialization request requesting initialization of one or more desired MPONM 106\* instead. For these embodiments, more than one desired MPONM 106\* may be specified in a single request, with the request returning multiple corresponding handles (or pointers) for the successfully initialized ones of the requested MPONM 106\*.

As illustrated in FIG. 2b, upon having a need to request a service or having an operation performed in a function block of a MPONM 106\*, networking application 112 retrieves the handle (or pointer) to the data structure 118 of the MPONM 106\*, block 212, formats, and submits the request to an externalized function 115b of MPONM API 114.

For the embodiment, some requests (e.g. requests associated with invoking cross function block externalized functions) may include identifications of the function blocks within which the requested operations are to be performed. However, whether through association of the invoked externalized function or identification, the identification of the function block is not particularized to a MPONM 106\*; and neither is an identification of the MPONM 106\* provided. Instead, the MPONM 106\* within which the identified function block the requested operation is to be performed is implicitly identified. More specifically, the handle (or pointer) of the corresponding module data structure 118 of the MPONM 106 is provided.

As those skilled in the art would appreciate, the implicit reference through the handle or pointer of the module data structure 118 of the MPONM 106* of interest, improves the ease of use for the software developers of networking applications, who are more use to working with handles/pointers, as opposed to having to be cognizant of specific hardware modules and hardware details, including the details of the connection interfaces through which the MPONM 106* are correspondingly connected.

Further, the present invention improves the ease of use by providing a "modeless" manner of operation. That is, under the present invention, the developers of networking application 112 need not "select a MPONM of interest" first, before requesting an operation or service to be performed within a function block of the MPONM of interest. Through the advantageous employment of the handle/pointer to the corresponding module data structure, the "selection" operation is integrated with the operation/service request.

Module Data Structure

Figure 3:
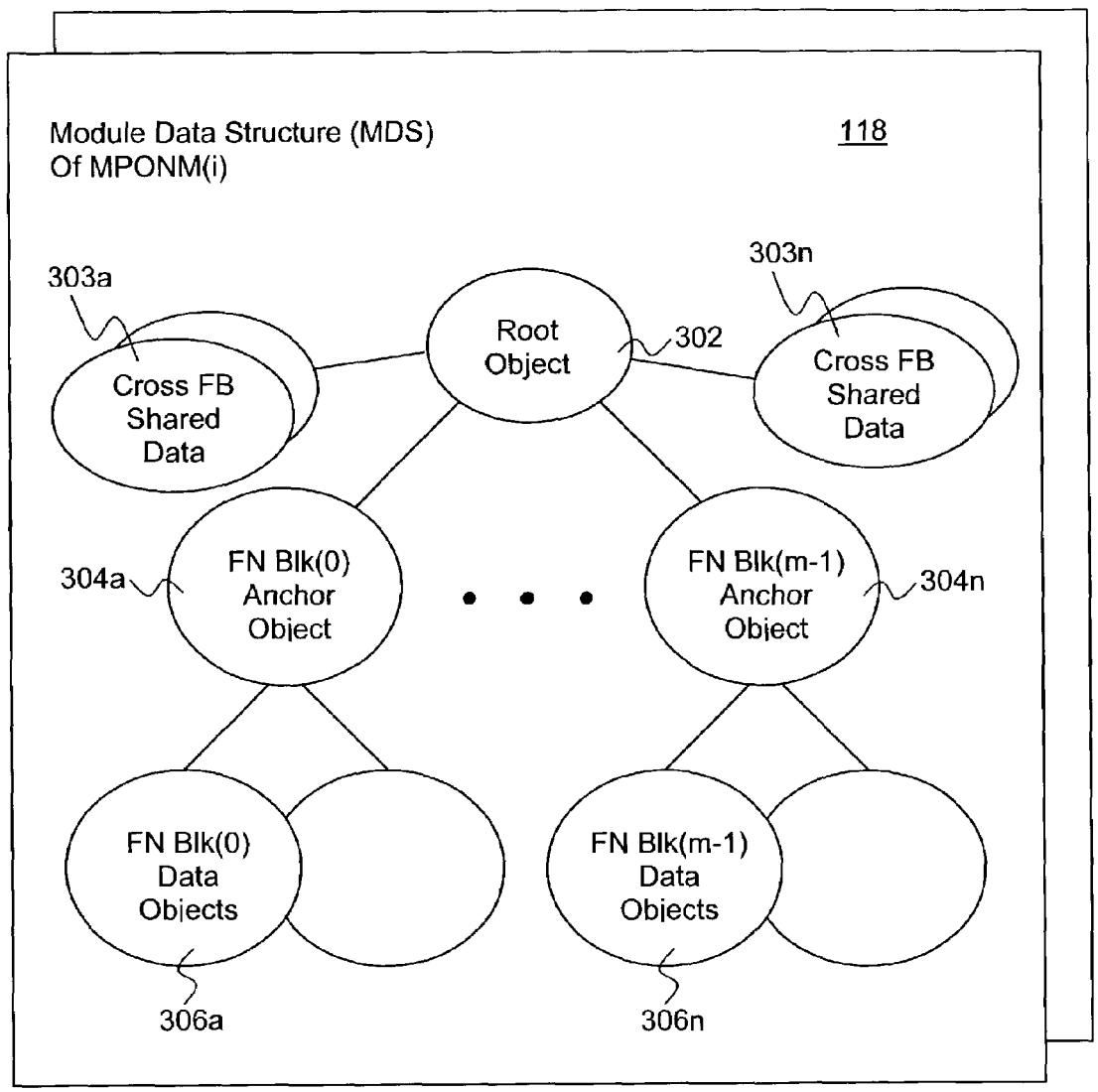
FIG. 3 illustrates the corresponding module data structures of the MPONM, employed to practice the present invention, in further detail, in accordance with one embodiment.

FIG. 3 illustrates an exemplary data organization suitable for use to store various module related data to practice the present invention, in accordance with one embodiment. As illustrated, for the embodiment, module data structures 118 employed to facilitate the practice of the present invention are implemented in an object oriented manner. As described earlier, one data structure 118 is employed for each MPONM 106.

As illustrated, each module data structure 118 includes a root object 302 and cross function block objects 303* having cross function block shared data variables. Examples of data included in cross function block objects 303* include but are not limited to data and/or pointers employed in interacting with the appropriate device driver 117 for the particular MPONM 106*, module identifier.

Additionally, each module data structure 118 includes a number of "anchor" data objects 304*, one each for the function blocks supported. "Anchor" data objects 304* may include a number of function block specific control data variables. Examples of such function block specific control data variables include status variables denoting e.g. whether the corresponding function block service routine 116 was successful in performing certain requested operations and state variables denoting a current mode of operation e.g. protocol type being processed.

Further, attached with each "anchor" data objects 304* of the function blocks, are function block specific data objects 306*, having function block specific operational data variables. Examples of such function block specific operational data variables include bit masks, data rates, filter criteria, event counters, capture and insertion data buffers, and so forth.

In alternate embodiments, the present invention may be practiced using other data organization approaches.

Module Initialization Function

Figure 4:
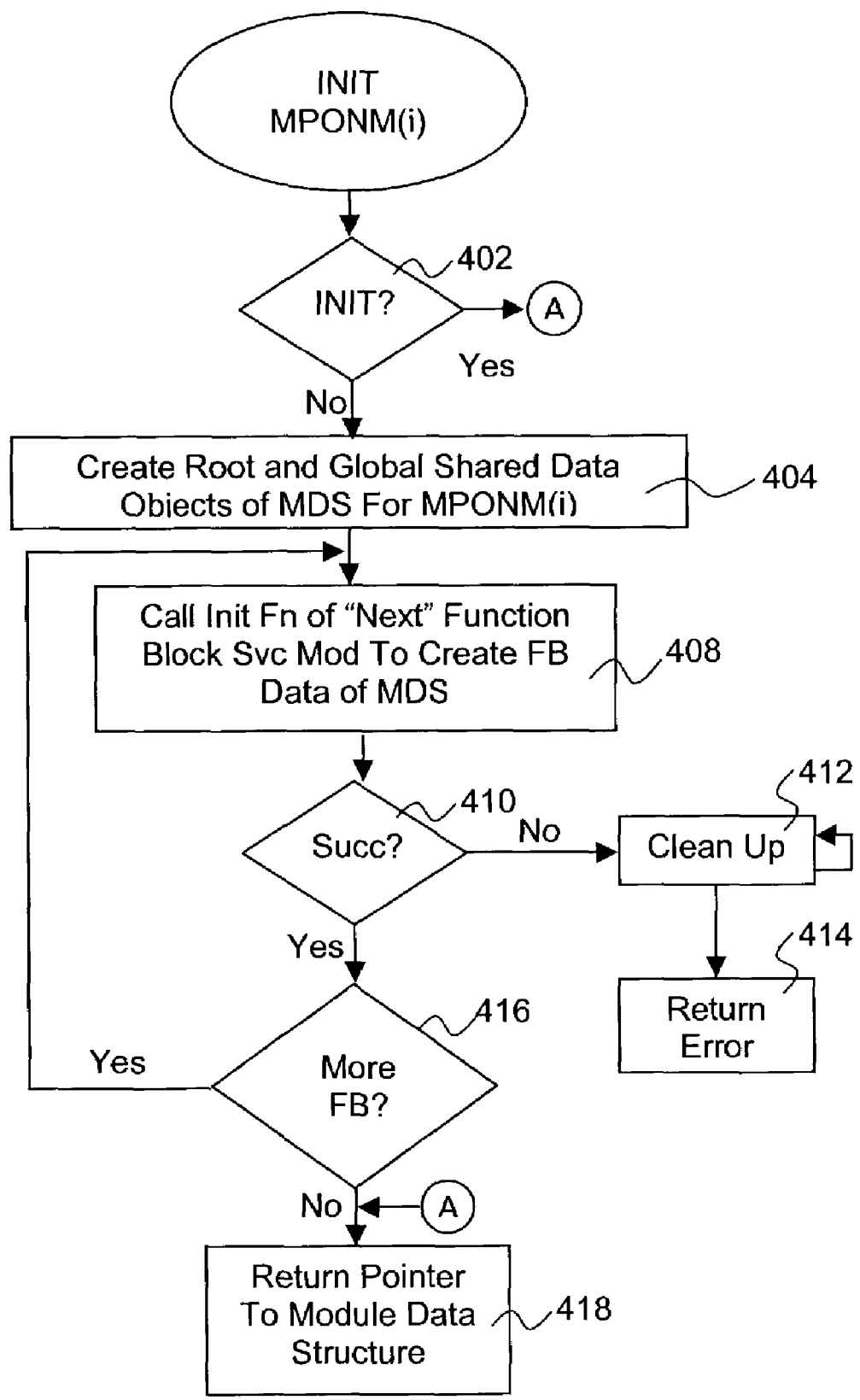
FIG. 4 illustrates the operational flow of the relevant aspects of a module initialization function of the MPONM API of the present invention, in accordance with one embodiment.

FIG. 4 illustrates the operating flow of the relevant aspects of the module initialization function 115*a* of NPONM API 114 for practicing the present invention, in accordance with one embodiment.

As illustrated, for the embodiment, upon receipt of a request to initialize a MPONM 106*, initialization function 115*a* of MPONM API 114 determines if the MPONM 106* has previously been initialized before, block 402. More specifically, initialization function 115*a* determines whether the corresponding module data structure 118 of the MPONM 106* has previously been created or not (e.g. as a result of responding to another initialization request for the same MPONM 106 by this same or another networking application 112). If so, initialization function 115*a* returns the handle/pointer of the corresponding module data structure 118 of the MPONM 106 immediately, block 418.

Otherwise, i.e. if the module data structure 118 has not been previously created before, initialization function 115*a* creates the root and cross function block objects 302-303* of the module data structure 118 of the MPONM 106, block 404.

Thereafter, initialization function 115*a* successively calls the initialization functions 119*a* of the corresponding function block service routines 116 of the function blocks to contribute to the creation of data structure 118, block 408. In response, each of the initialization functions 119*a* of the corresponding function block service routines 116 creates the corresponding anchor and descendant data objects 304*-306* for the corresponding function block of the MPONM 106*, block 408.

For the embodiment, after each invocation, initialization function 115*a* further determines if the contributory creation expected of the invoked initialization function 119*a* of the function block service routine 116 is successful, block 410. If an error is returned for the contributory creation, initialization function 115*a* successively undoes all prior successful additions to the module data structure 118, block 412, and returns an error notice to the network application 112, block 414.

If the contributory creation was determined to be successful at block 410, initialization function 115*a* further determines if more initialization functions 119*a* of additional function block service routines 116 are to be invoked, block 416. If at least one initialization function 119*a* of an additional function block service routine 116 is to be invoked, initialization function 115*a* continues operation at block 408 as earlier described.

If not, the cooperative creation initialization process is completed, and initialization function 115*a* returns the handle/pointer of the data structure 118 of MPONM 106* as earlier described, block 418.

In various embodiments, successive invocation of the initialization functions 119*a* of the function block service routines 116 to contribute to the creation of the module data structure 118 may be made in a predetermined order, to address certain application dependencies, such as data dependencies between data of the different function blocks.

Invocation of Externalized Functions

Operationally, as described earlier, upon having a need to have an operation performed within a function block (of a MPONM 106*), networking application 112 requests an appropriate externalized function 115*b* accordingly.

Typically, the same externalized function 115*b* is invoked for the same function block of different MPONM 106*. Moreover, the request does not explicitly identify the MPONM 106*, only the module data structure 118 of the MPONM 106*. Nevertheless, the invoked externalized function of the MPONM API 114 processes the request and interacts with the appropriate functions 119*b* of the appropriate function block service routines 116 to operate on the appropriate function block of the appropriate MPONM 106* accordingly.

Resultantly, accessing, controlling or otherwise interacting with MPONM 106* by networking applications 112 is streamlined.

Note that as alluded to earlier, the exact manner an initialization function 119a of a function block service routine 116 contributes in the creation of the module data structure of a MPONM 106*, i.e. the kind of data variables the function block service routine 116 adds to, maintain, or otherwise manipulate, using module data structure 118 is application dependent. Similarly, the nature and the manner the various functions 119b of the function block service routine 116 interacts with the corresponding function blocks of MPONM 106*, are also application dependent. These issues vary from function blocks to function blocks.

Conclusion and Epilogue

Thus, it can be seen from the above descriptions, a novel highly flexible MPONM API equipped to streamline and improve the ease of network applications in accessing, controlling or otherwise interacting with function blocks of multi-protocol network processors of MPONM has been described. While the present invention has been described in terms of the above described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. In an optical networking apparatus having a plurality of multi-protocol optical networking modules (MPONM), at least one of said MPONM having a plurality of function blocks, a method comprising:
    requesting an initialization function of an MPONM application programming interface (API) to initialize a first of said MPONM, including with the initialization request a first identification of a first device driver of a first connection interface to which the first MPONM is attached;
    receiving from the MPONM API a first handle of a first data structure cooperatively created by utilizing the initialization function of the MPONM API with service routines of the function blocks, in response to the initialization request; and
    requesting an externalized function of the MPONM API to perform a first operation in a first function block of the first MPONM, including with the request to perform the first operation the first handle of the first data structure created for the first MPONM.

2. The method of claim 1, wherein the handle comprises a first pointer to the first data structure of the first MPONM.

3. The method of claim 1, wherein the first operation includes a configuration operation to configure the first function block of the first MPONM.

4. The method of claim 1, wherein the method further comprises:
    in response to receiving the first handle of the first data structure, saving the first handle of the first data structure; and
    retrieving the first handle of the first data structure for use to form the request to perform the first operation in the first function block of the first MPONM.

5. The method of claim 1, wherein the method further comprises requesting an externalized function of the MPONM API to perform a second operation in the first function block of the first MPONM, including with the request to perform the second operation the first handle of the first data structure created for the first MPONM.

6. The method of claim 5, wherein the method further comprises requesting an externalized function of the MPONM API to perform a third operation in a second function block of the first MPONM, including with the request to perform the third operation the first handle of the first data structure created for the first MPONM.

7. The method of claim 6, wherein the method further comprises:
    requesting the initialization function of the MPONM application programming interface (API) to initialize a second of said MPONM, including with the second initialization request a second identification of a second device driver of a second connection interface to which the second MPONM is attached;
    receiving from the MPONM API a second handle of a second data structure cooperatively created by the initialization function of the MPONM API in conjunction with service routines of the function blocks, in response to the second initialization request; and
    requesting an externalized function of the MPONM API to perform a fourth operation in a third function block of the second MPONM, including with the request to perform the fourth operation the second handle of the second data structure created for the second MPONM.

8. The method of claim 1, wherein the method further comprises requesting an externalized function of the MPONM API to perform a second operation in a second function block of the first MPONM, including with the request to perform the second operation the first handle of the first data structure created for the first MPONM.

9. The method of claim 8, wherein the method further comprises:
    requesting the initialization function of the MPONM application programming interface (API) to initialize a second of said MPONM, including with the second initialization request a second identification of a second device driver of a second connection interface to which the second MPONM is attached;
    receiving from the MPONM API a second handle of a second data structure cooperatively created by the initialization function of the MPONM API in conjunction with service routines of the function blocks, in response to the second initialization request; and
    requesting an externalized function of the MPONM API to perform a third operation in a third function block of the second MPONM, including with the request for the third operation the second handle of the second data structure created for the second MPONM.

10. The method of claim 1, wherein the method further comprises:
    requesting the initialization function of the MPONM application programming interface (API) to initialize a second of said MPONM, including with the second initialization request a second identification of a second device driver of a second connection interface to which the second MPONM is attached;
    receiving from the MPONM API a second handle of a second data structure cooperatively created by the initialization function of the MPONM API in conjunction with service routines of the function blocks, in response to the second initialization request; and
    requesting an externalized function of the MPONM API to perform a second operation in a second function block of the second MPONM, including with the second operation request for the second operation the second handle of the second data structure created for the second MPONM.

11. The method of claim 1, the method comprising:
in response to said initialization request, cooperatively creating a first data structure for the first MPONM by utilizing the initialization function of the MPONM API together with corresponding service routines of the function blocks if the first data structure of the first MPONM has not been previously created; and
returning the first handle of the cooperatively created first data structure of the first MPONM to a networking application.

12. The method of claim 11, wherein the first handle comprises a first pointer to the first data structure of the first MPONM.

13. The method of claim 11, wherein the method further comprises determining whether the first data structure of the first MPONM has been previously created.

14. The method of claim 11, wherein cooperative creation of the first data structure of the first MPONM comprises:
first creating a root data object and a number of cross functional block shared data objects;
successively invoking the corresponding service routines of the function blocks to add to and to complete the creation of the first data structure of the first MPONM.

15. The method of claim 14, wherein the cross functional block shared data objects comprise a plurality of flow state variables for storing state values of networking flows being handled by the first MPONM.

16. The method of claim 14, wherein the cross functional block shared data objects comprise a plurality of variables for storing or obtaining values of the various function blocks of the first MPONM.

17. The method of claim 14, wherein the root data object comprises data to facilitate interaction with the first device driver.

18. The method of claim 14, wherein the method further comprises determining whether invoking at least one of the corresponding service routines of the function blocks to add to and to complete the creation of the first data structure of the first MPONM is successful.

19. The method of claim 18, wherein the method further comprises:
successively undoing additions made to the corresponding ones of the first data structure by previous successful invoking of the corresponding service routines of the function blocks when an invoking is determined to be unsuccessful;
returning an error notification to the networking application.

20. The method of claim 14, wherein:
said functional blocks comprise selected pluralities of a physical layer processing block, a media access processing block, a packet filtering processing block, an Ethernet protocol processing block, a packet on SONET protocol processing block, a point to point protocol processing block, a SONET protocol processing block, a System Packet Interface Level 4 input/output signal processing block, and a System Fiber Interface input/output signal processing block; and
said successive invoking of service routines of the functional blocks comprises successive invoking service routines of the selected pluralities of the physical layer processing block, the media access processing block, the packet filtering processing block, the Ethernet protocol processing block, the packet on SONET protocol processing block, the point to point protocol processing, block, the SONET protocol processing block, the System Packet Interface Level 4 input/output signal processing block, and the System Fiber Interface input/output signal processing block.

21. The method of claim 11, wherein the method further comprises receiving from the networking application a first request to perform a first operation in a first function block of the first MPONM expressed in a form invoking a first externalized function associated with the first function block and including with said invocation the first handle of the first data structure of the first MPONM.

22. The method of claim 21, wherein the method further comprises receiving from the networking application a second request to perform a second operation in a second function block of the first MPONM expressed in the same form invoking a second function associated with the second function block and including with the invocation the first handle of the first data structure of the first MPONM.

23. The method of claim 22, wherein the method further comprises:
receiving from the networking application a second initialization request to initialize a second of said MPONM, the second initialization request including a second identification of a second device driver of a second connection interface to which the second MPONM is attached;
in response to said receiving, cooperatively creating a second data structure for the second MPONM by utilizing the initialization function of the MPONM API in conjunction with corresponding service routines of the function blocks if the second data structure of the second MPONM has not been previously created; and
returning a second handle of the cooperatively created second data structure of the second MPONM to the networking application.

24. The method of claim 23, wherein the method further comprises receiving from the networking application a third request to perform a third operation in a third function block of the second MPONM expressed in the same form invoking an externalized function associated with the third function block and including with the invocation, the second handle of the second data structure of the second MPONM.

25. The method of claim 21, wherein the method further comprises:
receiving from the networking application a second initialization request to initialize a second of said MPONM, the second initialization request including a second identification of a second device driver of a second connection interface to which the second MPONM is attached;
in response to said receiving, cooperatively creating a second data structure for the second MPONM by utilizing the initialization function of the MPONM API in conjunction with corresponding service routines of the function blocks if the second data structure of the second MPONM has not been previously created; and
returning a second handle of the cooperatively created second data structure of the second MPONM to the networking application.

26. The method of claim 25, wherein the method further comprises receiving from the networking application a second request to perform a second operation in a second function block of the second MPONM expressed in the same form invoking an externalized function associated with the second function block and including with the invocation, the second handle of the second data structure of the second MPONM.

27. The method of claim 11, wherein the method further comprises:
receiving from the networking application a second initialization request to initialize a second of said MPONM, the second initialization request including a second identification of a second device driver of a second connection interface to which the second MPONM is attached;
in response to said receiving, cooperatively creating a second data structure for the second MPONM by utilizing the initialization function of the MPONM API in conjunction with corresponding service routines of the function blocks if the second data structure of the second MPONM has not been previously created; and
returning a second handle of the cooperatively created second data structure of the second MPONM to the networking application.

28. A networking apparatus comprising:
a plurality of multi-protocol optical networking modules (MPONM), each having a plurality of function blocks;
memory coupled to the plurality of MPONM, having stored therein a plurality of programming instructions implementing a plurality of functions of an application programming interface (API) including an initialization function to:
receive from a networking application a first initialization request to initialize a first of said MPONM, the first initialization request including a first identification of a first device driver of a first connection interface to which the first MPONM is attached;
in response to receiving the first initialization request, cooperatively create a first data structure for the first MPONM by utilizing the initialization function of the MPONM API with corresponding service routines of the function blocks if the first data structure of the first MPONM has not been previously created, and
return a first handle of the cooperatively created first data structure of the first MPONM to the networking application; and
at least one processor coupled to the memory and the plurality of MPONM to execute the programming instructions.

29. The apparatus of claim 28, wherein the first handle comprises a first pointer to the first data structure of the first MPONM.

30. The apparatus of claim 28, wherein the programming instructions further implement the initialization function to determine whether the first data structure of the first MPONM has been previously created.

31. The apparatus of claim 28, wherein the programming instructions implement the initialization function to perform said cooperative creation of the first data structure of the first MPONM by:
creating a root data object and a number of cross functional block shared data objects; and
successively invoking the corresponding service routines of the function blocks to add to and to complete the creation of the first data structure of the first MPONM.

32. The apparatus of claim 31, wherein the cross functional block shared data objects comprise a plurality of flow state variables for storing state values of networking flows being handled by the first MPONM.

33. The apparatus of claim 31, wherein the cross functional block shared data objects comprise a plurality of variables for obtaining or storing values of the various function blocks of the first MPONM.

34. The apparatus of claim 31, wherein the root data object comprises data to facilitate interaction with the first device driver.

35. The apparatus of claim 31, wherein the programming instructions further implement the initialization function to determine whether each of said successive invoking of the corresponding service routines of the function blocks to add to the corresponding ones of first data structure and to complete creation of the first data structure of the first MPONM is successful.

36. The apparatus of claim 35, wherein the programming instructions further implement the initialization function to:
successively undo additions made to the first data structure by previous successful invoking of the corresponding service routines of the function blocks when an invoking is determined to be unsuccessful; and
return an error notification to the networking application.

37. The apparatus of claim 31, wherein:
said functional blocks comprise selected pluralities of a physical layer processing block, a media access processing block, a packet filtering processing block, an Ethernet protocol processing block, a packet on SONET protocol processing block, a point to point protocol processing block, a SONET protocol processing block, a System Packet Interface Level 4 input/output signal processing block, and a System Fiber Interface input/output signal processing block; and
said successive invoking of service routines of the functional blocks comprises successive invoking service routines of the selected pluralities of the physical layer processing block, the media access processing block, the packet filtering processing block, the Ethernet protocol processing block, the packet on SONET protocol processing block, the point to point protocol processing block, the SONET protocol processing block, the System Packet Interface Level4 input/output signal processing block, and the System Fiber Interface input/output signal processing block.

38. The apparatus of claim 28, wherein the programming instructions further implement a first externalized function of the API, associated with a first function block, to receive from the networking application a first request to perform a first operation in a first function block of the first MPONM expressed in a form invoking the first externalized function and including with said invocation the first handle of the first data structure of the first MPONM.

39. The apparatus of claim 38, wherein the programming instructions further implement a second externalized function of the API, associated with a second function block, to receive from the networking application a second request to perform a second operation in a second function block of the first MPONM expressed in the same form invoking the second externalized function and including with the invocation the first handle of the first data structure of the first MPONM.

40. The apparatus of claim 39, wherein the programming instructions further implement the initialization function to:
receive from the networking application a second initialization request to initialize a second of said MPONM, the second initialization request including a second identification of a second device driver of a second connection interface to which the second MPONM is attached;

in response to receiving the second initialization request, cooperatively create a second data structure for the second MPONM in conjunction with corresponding service routines of the function blocks if the second data structure of the second MPONM has not been previously created; and return a second handle of the cooperatively created second data structure of the second MPONM to the networking application.

41. The apparatus of claim 40, wherein the programming instructions further implement the first externalized function to receive from the networking application a third request to perform a third operation in the first function block of the second MPONM expressed in the same form invoking the first externalized function and including with the invocation, the second handle of the second data structure of the second MPONM.

42. The apparatus of claim 38, wherein the programming instructions further implement the initialization function to:

receive from the networking application a second initialization request to initialize a second of said MPONM, the second initialization request including a second identification of a second device driver of a second connection interface to which the second MPONM is attached;

in response to receiving the second initialization request, cooperatively create a second data structure for the second MPONM by utilizing the initialization function of the MPONM API in conjunction with corresponding service routines of the function blocks if the second data structure of the second MPONM has not been previously created; and return a second handle of the cooperatively created second data structure of the second MPONM to the networking application.

43. The apparatus of claim 42, wherein the programming instructions further implement the first externalized function to receive from the networking application a second request to perform a second operation in the first function block of the second MPONM expressed in the same form invoking the first externalized function and including with the invocation, the second handle of the second data structure of the second MPONM.

44. The apparatus of claim 28, wherein the programming instructions further implement the initialization function to:

receive from the networking application a second initialization request to initialize a second of said MPONM, the second initialization request including a second identification of a second device driver of a second connection interface to which the second MPONM is attached;

in response to receiving the second initialization request, cooperatively create a second data structure for the second MPONM by utilizing the initialization function of the MPONM API in conjunction with corresponding service routines of the function blocks if the second data structure of the second MPONM has not been previously created; and return a second handle of the cooperatively created second data structure of the second MPONM to the networking application.

* * * * *